United States Patent [19]
Ikeda

[11] Patent Number: 5,379,173
[45] Date of Patent: Jan. 3, 1995

[54] MAGNETIC DISK JACKET

[75] Inventor: Hiroshi Ikeda, Tochigi, Japan

[73] Assignee: Kao Corporation, Tokyo, Japan

[21] Appl. No.: 74,467

[22] Filed: Jun. 10, 1993

[30] Foreign Application Priority Data

Jul. 17, 1992 [JP] Japan .................. 4-191124

[51] Int. Cl.$^6$ .................. G11B 23/50; G11B 5/41
[52] U.S. Cl. ............................ 360/133; 360/128
[58] Field of Search ............. 360/133, 128; 369/291, 369/292

[56] References Cited

U.S. PATENT DOCUMENTS

| 4,901,180 | 2/1990 | Oishi | 360/133 |
| 5,060,105 | 10/1991 | Howey | 360/133 |
| 5,146,381 | 9/1992 | Ikeda et al. | 360/133 |

FOREIGN PATENT DOCUMENTS

| 2545091 | 4/1976 | Germany | 360/133 |
| 1165871 | 7/1986 | Japan | 360/133 |

Primary Examiner—A. J. Heinz
Assistant Examiner—George J. Letscher
Attorney, Agent, or Firm—Birch, Stewart, Kolasch & Birch

[57] ABSTRACT

A magnetic disk jacket having, disposed on an internal surface of a jacket frame, a liner for cleaning a magnetic disk, wherein the liner comprises 0.03–0.5 g per kg of said liner of a modified straight chain type polydimethylsiloxane having in each molecule thereof at least one group selected from the group consisting of hydroxyl, amino, mercapto, carboxyl, α-methylstyrene group, α-olefin group, fluorine, alkyl, higher fatty acid group, methacrylic group, acrylic group, polyether group and epoxy group, said modified straight chain type polydimethylsiloxane having a viscosity of from 50 to 3000 cSt at a temperature of 25° C.

4 Claims, 3 Drawing Sheets

MAGNETIC DISK JACKET

BACKGROUND OF THE INVENTION

1. Field of the Invention

The present invention relates to a magnetic disk jacket. More particularly, the present invention is concerned with a magnetic disk jacket having a liner with an increased dust collecting capability to thereby improve the efficiency of cleaning the magnetic disk.

2. Description of the Prior Art

A conventional magnetic disk jacket has a structure in which a liner for cleaning a magnetic disk is disposed on an internal surface of a jacket frame.

With respect to such a liner, the extent of swelling thereof is appropriately controlled, depending on the condition of fusion thereof to the internal surface of the jacket frame, to thereby improve cleaning efficiency and avoid regeneration of dust or the like collected with the liner.

In the case of a magnetic disk jacket for 3.5-inch magnetic disks, a lifter is disposed between the liner and the internal surface of the jacket frame, whereby the liner is partially swelled toward the surface of the magnetic disk so that the swelled portion of the liner is used for cleaning the surface of the magnetic disk.

However, in the conventional magnetic disk jacket, the means for cleaning the magnetic disk have been limited to the extent of control of swelling of the liner so as to improve cleaning efficiency, and to the conditioning of the fusion pattern of the liner to the internal surface of the jacket frame so as to prevent generation of dust or the like included in the liner. Thus the improvement in cleaning performance by these measures has been successful only to a limited extent. Moreover, various types of treatments are incorporated into the liner material, which causes a problem wherein the treatments migrate into the surface portion of a rotating magnetic disk to thereby raise the coefficient of dynamic friction between the liner and the magnetic disk.

SUMMARY OF THE INVENTION

Therefore, it is an object of the present invention to provide a magnetic disk jacket wherein the dust collecting capability of the liner is increased to thereby improve the cleaning efficiency thereof, and the migration of the treatments or the like contained in the liner material is inhibited to thereby stabilize the coefficient of dynamic friction with respect to the surface of the magnetic disk.

According to the present invention, there is provided a magnetic disk jacket having, disposed on an internal surface of a jacket frame, a liner for cleaning a magnetic disk, wherein the liner contains 0.01-1 g, per kg of said liner, of a modified straight chain type polydimethylsiloxane having in each molecule thereof at least one group selected from among hydroxyl, amino, mercapto, carboxyl, α-methylstyrene group, α-olefin group, fluorine, alkyl, higher fatty acid group, methacrylic group, acrylic group, polyether group and epoxy group, and having a viscosity of from 50 to 3000 cSt (at a temperature of 25° C.). The above-mentioned object is attained by the magnetic disk jacket provided according to the present invention.

In the magnetic disk jacket according to the present invention, not only the dust collecting capability of the liner is increased to thereby improve the cleaning efficiency thereof, but also the migration of the treatments or the like contained in the liner material is inhibited to thereby stabilize the coefficient of dynamic friction with respect to the surface of the magnetic disk.

DETAILED DESCRIPTION OF THE INVENTION

The present invention is applicable to magnetic disk jackets of various sizes. The magnetic disk jackets of various sizes according to the present invention have fundamentally the same structures as those of the conventional magnetic disk jackets of various sizes. Hereinbelow, the application of the present invention to a 3.5-inch magnetic disk jacket taken as an example will be described in greater detail by referring to FIGS. 1 to 3.

Figure 1:
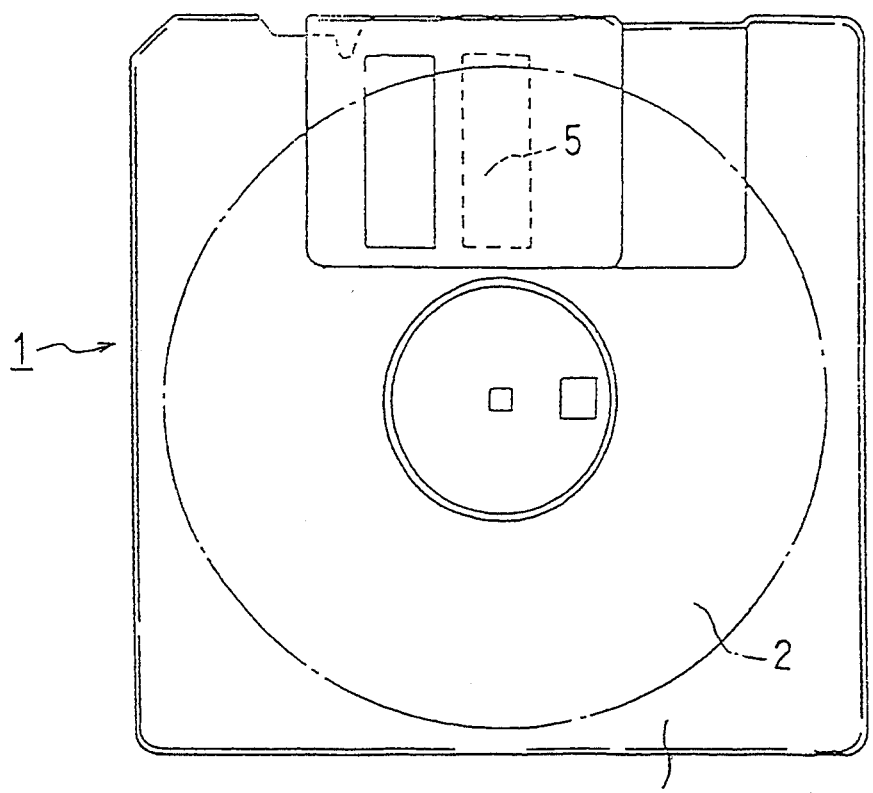
FIG. 1 is a plan view of a magnetic disk jacket of the present invention.
Figure 2:
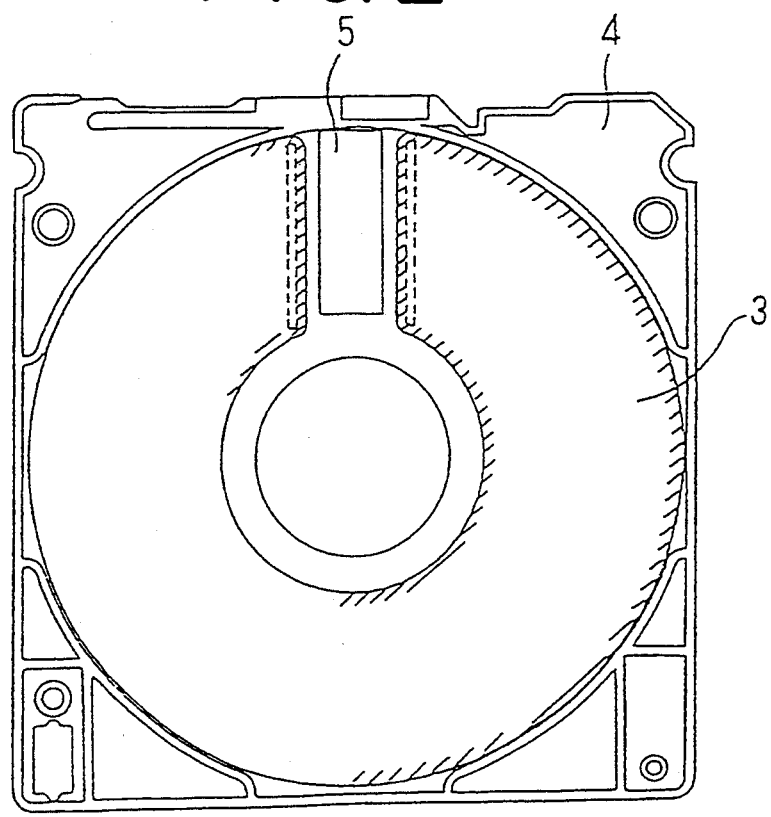
FIG. 2 is a view illustrating an internal surface of a jacket frame shown in FIG. 1.

The magnetic disk jacket of the present invention has a liner 3 for cleaning a magnetic disk 2, which is disposed on an internal surface of a jacket frame 4, as shown in FIGS. 1 and 2. In this respect, the magnetic disk jacket of the present invention is identical with the conventional magnetic disk jacket.

Characteristically, the liner 3 of the magnetic disk jacket 1 of the present invention comprises 0.01–1 g, per kg of said liner, of a modified straight chain type polydimethylsiloxane which contains, in each molecule thereof, at least one group selected from among hydroxyl, amino, mercapto, carboxyl, α-methylstyrene group, α-olefin group, fluorine, alkyl, higher fatty acid group, methacrylic group, acrylic group, polyether group and epoxy group and has a viscosity of from 50 to 3000 cSt (at a temperature of 25° C.).

Further description will be made with respect to the magnetic disk jacket of the present invention. As shown in FIG. 2, the liner 3 is substantially C-shaped and is fixed to an internal surface of a jacket frame 4, exclusive of a head window 5.

The material of the liner 3 is not particularly limited. The material suitably employed in the present invention includes conventional nonwoven fabrics, woven fabrics and other sheet materials, which are made of natural fibers, thermoplastic resin fibers or the like.

The modified straight chain type polydimethylsiloxane as a treatment for the liner 3 has a viscosity of from 50 to 3000 cSt, preferably from 500 to 2000 cSt, at 25° C. When the viscosity at 25° C. is less than 50 cSt, there is the danger that the treatment will migrate into the magnetic disk 2 to thereby contaminate the same. On the other hand, when the viscosity at 25° C. is more than 3000 cSt, there is the danger that the cleaning effect is extremely poor.

The modified straight chain type polydimethylsiloxane has, in each molecule thereof, at least one modifier group selected from among active hydrogen, hydroxyl, amino, mercapto, carboxyl, α-methylstyrene group, α-olefin group, fluorine, alkyl, higher fatty acid group, methacrylic group, acrylic group, polyether group and epoxy group. The modified straight chain type polydimethylsiloxane is higher in bonding strength to the liner material than an unmodified straight chain type polydimethylsiloxane, so that the modified straight chain type polydimethylsiloxane has less tendency to migrate into the magnetic disk 2, and can maintain a stable cleaning efficiency even after the lapse of time.

The modified straight chain type polydimethylsiloxane is contained in an amount of from 0.01 to 1 g, preferably from 0.03 to 0.5 g, per kg of the liner. When the amount is less than 0.01 g, the effect of the above treatment is lowered to render the efficiency of dust collection poor. On the other hand, when the amount exceeds 1 g, the above treatment migrates into the magnetic disk 2 due to the large amount so that there is the danger that the cleaning efficiency of the liner 3 is adversely affected.

In the magnetic disk jacket having the above structure, the above treatment serves to enhance the cleaning efficiency of the liner 3 per se so that the dust or the like adherent to the surface of the magnetic disk is effectively removed. Moreover, the treatment is not contained in excess in the liner 3, and can fix the dust or the like included in the liner 3 to the liner 3 so as to prevent them from being freed from the liner 3. Accordingly, the liner 3 can maintain a stable cleaning efficiency.

The addition of an extremely small amount of the modified straight chain type polydimethylsiloxane having the specified viscosity of the present invention to the liner material serves to improve the dust collection from the magnetic disk while preventing migration of siloxane into the magnetic disk medium.

The present invention will now be described with reference to the following Examples, which however should not be construed as limiting the scope of the present invention.

EXAMPLE 1

In this Example, a polyether-modified straight chain type polydimethylsiloxane having a viscosity of 1000 cSt at 25° C. was incorporated in a liner material in varied amounts as specified in Table 1 below to thereby obtain working samples 1 to 5 and comparative sample 1.

The dust collecting capability of each of these samples was evaluated by the following method to obtain results as shown in Table 1.

Method of Evaluation for Dust Collecting Capability (1) Silica sand particles of 30 to 70 μm were put through a head window onto the medium, and the number ($N_O$) of the particles put on the medium was counted.

(2) The medium was rotated once (to capture the silica sand particles by the liner).

(3) An impact of 20 G was applied to one edge of the jacket frame.

(4) The number (N) of the silica sand particles released to fall on the medium was counted.

(5) The above procedures (1) through (4) were repeated for 20 samples. From the obtained averages, the dust collection rate was calculated according to the following formula 1.

TABLE 1

[Numerical formula 1]
$$\text{Dust collection rate} = \frac{N_0 - N}{N_0} \times 100(\%)$$

| Working samples and comp. sample | Siloxane content (g/kg liner) | Dust collection rate (%) |
| --- | --- | --- |
| Working sample 1 | 0.016 | 70 |
| Working sample 2 | 0.031 | 88 |
| Working sample 3 | 0.062 | 91 |
| Working sample 4 | 0.12 | 96 |
| Working sample 5 | 0.25 | 95 |
| Comp. sample 1 | 0 | 33 |

EXAMPLE 2

Not only the working sample 5 of Example 1 but also working samples 6 and 7 and comparative samples 2 and 3 were prepared using the modified straight chain type polydimethylsiloxane used in Example 1.

The treatment migration in these samples was evaluated by the following method to obtain results as shown in Table 2.

Figure 3:
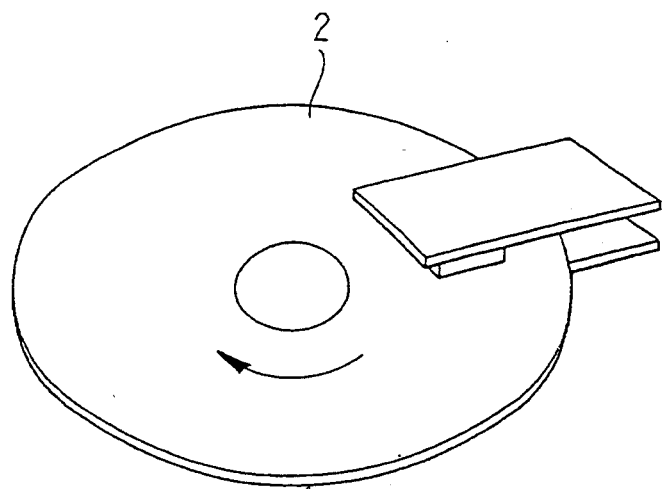
FIG. 3 is a perspective view of a key portion of an apparatus for measuring the coefficient of dynamic friction of a magnetic disk medium.

Method of Evaluation for Treatment Migration (1) The coefficient of dynamic friction of a magnetic disk medium 2 was measured using a dynamic friction coefficient meter shown in FIG. 3.

Figure 4:
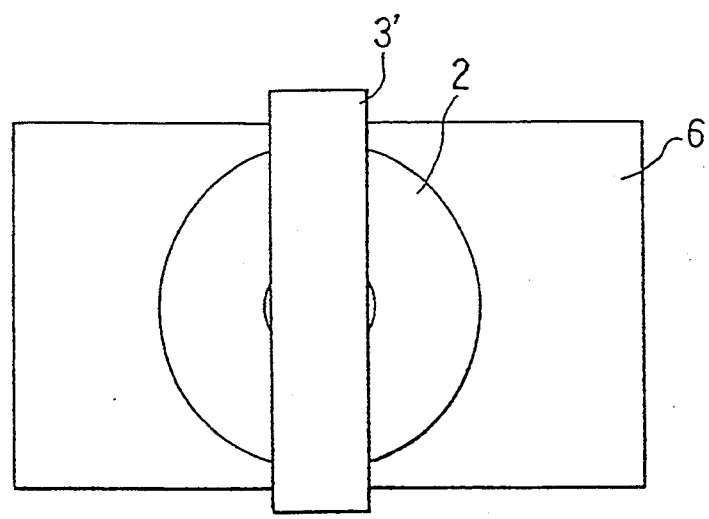
FIG. 4(a) and FIG. 4(b) are plan and section views, respectively, of an apparatus for evaluating the migration of the treatments from the liner material.
Figure 4:
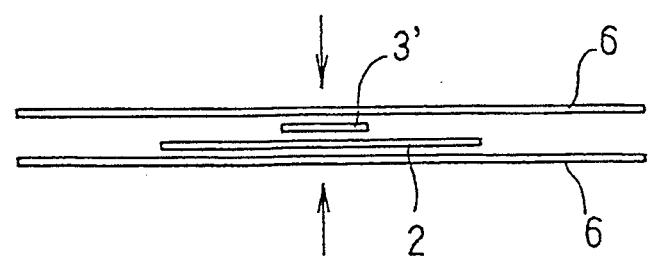

(2) As shown in FIG. 4, the magnetic disk medium 2 and a sample 3' selected from the above samples were piled one upon the other, pressed at a load of 10 g/cm² between conventional liners 6 and 6 not containing the modified straight chain type polydimethylsiloxane treatment, and stocked for one month under such conditions that the temperature was 40° C. and the relative humidity was 80%.

(3) The coefficient of dynamic friction of the stocked magnetic disk medium and that of the original unstocked magnetic disk medium were measured using the meter mentioned in the above.

(4) The increment (%) of the value of the coefficient of dynamic friction of the stocked magnetic disk medium from the value of that of the original unstocked magnetic disk medium was calculated as a parameter for evaluating the extent of migration of the liner treatment.

TABLE 2

| Working samples and comp. sample | Siloxane content (g/kg liner) | Increment (%) of the value of the coefficiency of dynamic friction |
| --- | --- | --- |
| Working sample 5 | 0.25 | 0 |
| Working sample 6 | 0.50 | 0 |
| Working sample 7 | 1.0 | 0 |
| Comp. sample 2 | 2.0 | 18 |
| Comp. sample 3 | 5.0 | 31 |

What is claimed is:

1. A magnetic disk jacket having, disposed on an internal surface of a jacket frame, a liner for cleaning a magnetic disk, said liner comprising 0.03–0.5 g per kg of said liner of a modified straight chain type polydimethylsiloxane having in each molecule thereof at least one group selected from the group consisting of hydroxyl, amino, mercapto, carboxyl, α-methylstyrene group, α-olefin group, fluorine, alkyl, higher fatty acid group, methacrylic group, acrylic group, polyether group and epoxy group, said modified straight chain type polydimethylsiloxane having a viscosity of from 50 to 3000 cSt at a temperature of 25° C.

2. The magnetic disk jacket of claim 1, wherein the viscosity of said modified straight chain type polydimethylsiloxane is from 500 to 2000 cSt at a temperature of 25° C.

3. The magnetic disk jacket of claim 1, wherein said liner is substantially C-shaped.

4. The magnetic disk jacket of claim 1, wherein said modified straight chain type polydimethylsiloxane is a polyether-modified straight chain type polydimethylsiloxane having a viscosity of 1000 cSt at 25° C.

* * * * *